United States Patent
Aida

(10) Patent No.: US 10,348,440 B2
(45) Date of Patent: Jul. 9, 2019

(54) POWER SUPPLY PATH-SWITCHING DEVICE, POWER SUPPLY PATH-SWITCHING SYSTEM, AND POWER SUPPLY PATH-SWITCHING METHOD

(71) Applicant: NEC CORPORATION, Tokyo (JP)

(72) Inventor: Ryuji Aida, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/570,462

(22) PCT Filed: May 9, 2016

(86) PCT No.: PCT/JP2016/002264
§ 371 (c)(1),
(2) Date: Oct. 30, 2017

(87) PCT Pub. No.: WO2016/181642
PCT Pub. Date: Nov. 17, 2016

(65) Prior Publication Data
US 2018/0145785 A1 May 24, 2018

(30) Foreign Application Priority Data

May 12, 2015 (JP) ................................. 2015-097314

(51) Int. Cl.
*H04J 14/02* (2006.01)
*H02H 3/00* (2006.01)
(Continued)

(52) U.S. Cl.
CPC ........... *H04J 14/0221* (2013.01); *H02H 3/00* (2013.01); *H02J 1/00* (2013.01); *H02J 9/06* (2013.01);
(Continued)

(58) Field of Classification Search
CPC .... H04B 10/808; H04J 14/021; H04J 14/0221
See application file for complete search history.

(56) References Cited

U.S. PATENT DOCUMENTS

| 2010/0202172 | A1* | 8/2010 | Skirda | G05D 23/1909 363/89 |
| 2010/0259222 | A1* | 10/2010 | Senriuchi | H01M 2/34 320/134 |

(Continued)

FOREIGN PATENT DOCUMENTS

| JP | 01-220531 A | 9/1989 |
| WO | 2013/002391 A1 | 1/2013 |

(Continued)

OTHER PUBLICATIONS

Takanori Inoue et al., "Technique for increasing the capacity and reliability of an optical submarine cable network that supports international communication", NEC Technical Journal, Aug. 2013, pp. 18-21, vol. 66, No. 1 Internet: <URL:http://jpn.nec.com/techrep/journal/g13/n01/pdf/130104.pdf>.

(Continued)

*Primary Examiner* — Dzung D Tran
(74) *Attorney, Agent, or Firm* — Sughrue Mion, PLLC

(57) ABSTRACT

In order to provide a power supply path-switching device, a power supply path-switching system, and a power supply path-switching method with which it is possible to utilize to the maximum equipment in which a failure has not occurred without imparting a power supply function to a branch station side even when a failure has occurred in the power supply function of the trunk station side, a power supply path-switching device (10) is provided with a first switching means (20), a second switching means (30), a grounding means (40), and a power consumption circuit (50) that operates by being supplied with the power supply. When a failure occurs in a first power supply line (61), the power (Continued)

consumption circuit (50) grounds the first power supply line (61), one end of the power consumption circuit (50) being connected to the grounding means (40) and a second power supply line (62) being connected to the other end of the power consumption circuit (50). When a failure occurs in the second power supply line (62), the power consumption circuit (50) grounds the second power supply line (62), the first power supply line (61) being connected to one end of the power consumption circuit (50) and the other end of the power consumption circuit (50) being connected to a grounding means (24).

16 Claims, 11 Drawing Sheets

(51) Int. Cl.
| | |
|---|---|
| *H02J 1/00* | (2006.01) |
| *H02J 9/06* | (2006.01) |
| *H04B 3/44* | (2006.01) |
| *H04B 10/03* | (2013.01) |
| *H04B 10/80* | (2013.01) |
| *H04Q 11/00* | (2006.01) |

(52) U.S. Cl.
CPC ............... *H04B 3/44* (2013.01); *H04B 10/03* (2013.01); *H04B 10/808* (2013.01); *H04J 14/021* (2013.01); *H04Q 11/0005* (2013.01); *H04Q 2011/0016* (2013.01); *H04Q 2011/0049* (2013.01)

(56) References Cited

U.S. PATENT DOCUMENTS

2012/0074894 A1* 3/2012 Chen ..................... B60L 11/005
                                                            320/103
2014/0091853 A1* 4/2014 Okano ............... H03K 17/0828
                                                            327/427

FOREIGN PATENT DOCUMENTS

WO    2013/094266 A1    6/2013
WO    2015/025518 A1    2/2015

OTHER PUBLICATIONS

International Search Report for PCT/JP2016/002264 dated Jul. 12, 2016.
Decision to Grant a Patent dated Oct. 2, 2018 from the Japanese Patent Office in counterpart application No. 2017-517610.

* cited by examiner

POWER SUPPLY PATH-SWITCHING DEVICE 10

POWER SUPPLY PATH-SWITCHING SYSTEM 70

POWER SUPPLY PATH-SWITCHING DEVICE, POWER SUPPLY PATH-SWITCHING SYSTEM, AND POWER SUPPLY PATH-SWITCHING METHOD

CROSS REFERENCE TO RELATED APPLICATIONS

This application is a National Stage of International Application No. PCT/JP2016/002264 filed May 9, 2016, claiming priority based on Japanese Patent Application No. 2015-097314 filed May 12, 2015, the contents of all of which are incorporated herein by reference in their entirety.

TECHNICAL FIELD

The present invention relates to a power supply path-switching device, a power supply path-switching system, and a power supply path-switching method, and more particularly, to a power supply path-switching device, a power supply path-switching system, and a power supply path-switching method which control a power supply path for supplying power to a ROADM (reconfigurable optical add/drop multiplexer) functional circuit that operates by supplied power.

BACKGROUND ART

The number of submarine cable systems that transmit and receive a light signal between a plurality of ground stations through a submarine cable has been increasing. In a submarine cable system, a light signal is transmitted and received not only between two stations, but also among three or more ground stations, by branching a transmission line and arranging a ROADM device and a third station. In this case, an optical fiber for transmitting and receiving a light signal is arranged in a submarine cable together with a power supply path for transmitting power.

In the above-mentioned submarine cable system, a repeater for amplifying light intensity of a light signal to be transmitted within the submarine cable is generally arranged between the stations. The repeater operates by power supplied from the ground station through the power supply path. Accordingly, for example, when supply of power to the repeater is interrupted due to an occurrence of an insulation failure or the like in the power supply path within the submarine cable, transmission and reception of a light signal between the stations are also interrupted. Therefore, even when a failure has occurred in the submarine cable or the like, there is an increasing demand for a submarine cable system capable of continuously using existing functions, to the maximum, by utilizing equipment in which no failure has occurred.

A technique for continuously using existing functions by utilizing equipment in which no failure has occurred when a failure has occurred in a submarine cable or the like is disclosed in, for example, PTL 1. In the technique in PTL 1, both-side power supply from an A-station and a B-station, which are trunk stations, is performed during a normal operation. For example, when a failure has occurred in a power supply line on the A-station side, the power supply line on the A-station side is grounded and a power supply line on the B-station side is connected to a power supply line on a C-station side, which is a branch station, thereby performing one-side power supply from the B-station and continuing transmission and reception of a light signal between the B-station and the C-station.

CITATION LIST

Patent Literature

[PTL 1] Japanese Unexamined Patent Application Publication No. H01-220531

SUMMARY OF INVENTION

Technical Problem

However, in the technique in PTL 1, although there is no need to supply power from the C-station side, which is a branch station, during a normal operation, there is a need to provide the branch station side with a power supply function which is used only when a failure has occurred in the trunk station side.

The present invention has been made in view of the above-mentioned problem, and an object of the present invention is to provide a power supply path-switching device, a power supply path-switching system, and a power supply path-switching method which are capable of utilizing, to the maximum, equipment in which no failure has occurred, without providing a power supply function for the branch station side even when a failure has occurred in a power supply function on the trunk station side.

Solution to Problem

In order to attain the above-mentioned object, a power supply path-switching device according to the present invention includes: a power consumption circuit that operates by supplied power; a grounding means; a first switching means for connecting a first power supply line, the power consumption circuit, and the grounding means to each other, based on a first control signal; and a second switching means for connecting a second power supply line, the power consumption circuit, and the grounding means to each other, based on a second control signal, wherein: the power consumption circuit generates, during a normal operation of the first power supply line and the second power supply line, the first control signal and the second control signal for connecting the first power supply line and the second power supply line, respectively, to the power consumption circuit; when a failure has occurred in the first power supply line, the power consumption circuit grounds the first power supply line, generates the first control signal for connecting one end of the power consumption circuit to the grounding means, and generates the second control signal for connecting the second power supply line to another end of the power consumption circuit; and when a failure has occurred in the second power supply line, the power consumption circuit generates the first control signal for connecting the first power supply line to one end of the power consumption circuit, grounds the second power supply line, and generates the second control signal for connecting another end of the power consumption circuit to the grounding means.

In order to attain the above-mentioned problem, a power supply path-switching system according to the present invention includes the power supply path-switching device described above, and a branch device that connects the first power supply line and the second power supply line to each other depending on an operation of the power supply path-switching device.

In order to attain the above-mentioned problem, a power supply path-switching method according to the present invention is a power supply path-switching method in a first power supply line and a second power supply line for supplying power to a power consumption circuit, and includes: connecting, during a normal operation of the first power supply line and the second power supply line, the first power supply line and the second power supply line to one end and another end of the power consumption circuit, respectively; grounding, when a failure has occurred in the first power supply line, the first power supply line, connecting the second power supply line to another end of the power consumption circuit, and connecting one end of the power consumption circuit and a grounding means; and grounding, when a failure has occurred in the second power supply line, the second power supply line, connecting the first power supply line and one end of the power consumption circuit, and connecting another end of the power consumption circuit and the grounding means.

Advantageous Effects of Invention

According to the above-mentioned aspects of the present invention, it is possible to utilize, to the maximum, equipment in which no failure has occurred, without providing a power supply function for a branch station side, even when a failure has occurred in a power supply function on a trunk station side.

BRIEF DESCRIPTION OF DRAWINGS

FIG. 10 (*b*) is a switching control diagram of the ROADM device 520 according to the second example embodiment when a failure has occurred in a submarine cable 620 on a B-station 300 side.

DESCRIPTION OF EMBODIMENTS

First Example Embodiment

Figure 1:
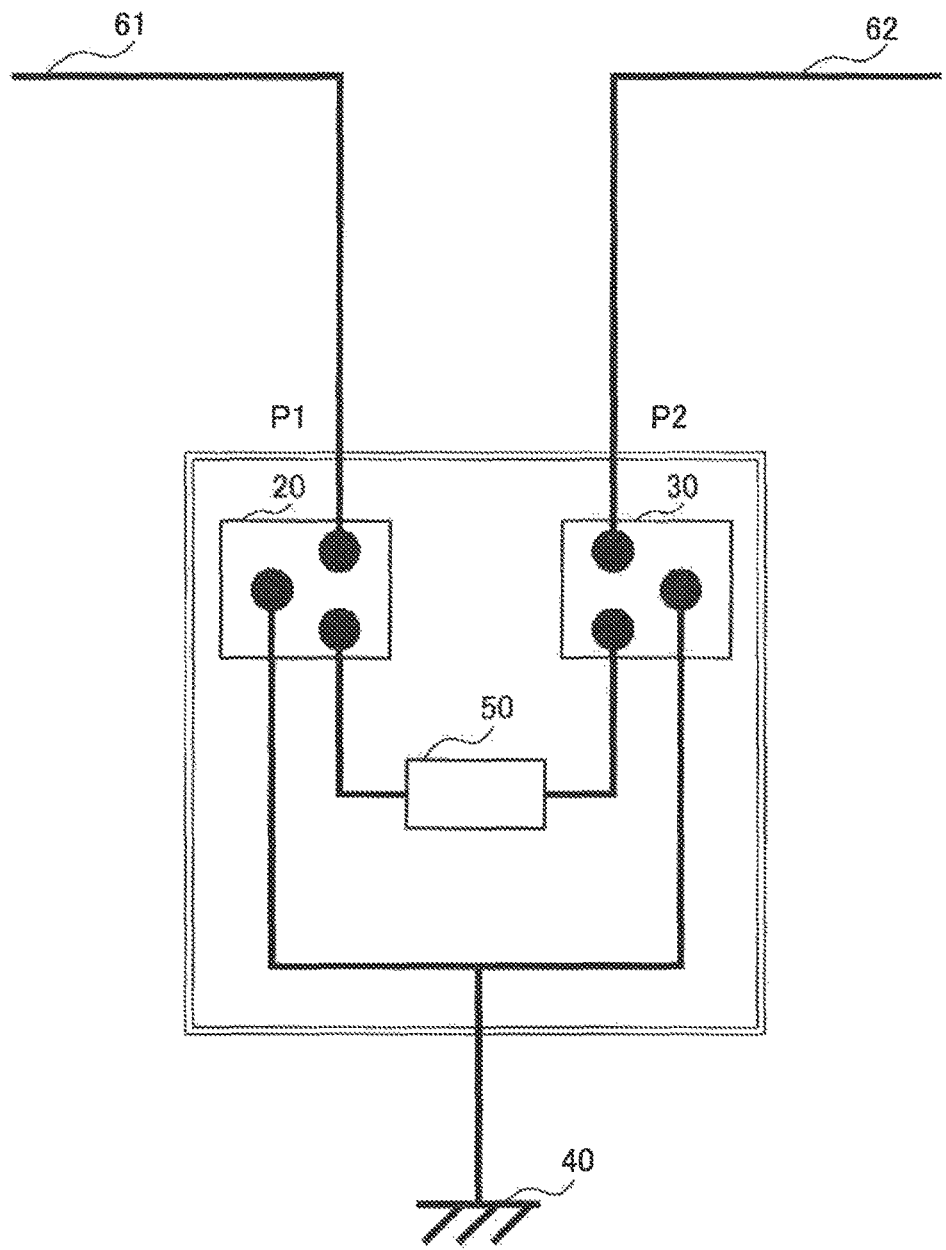
FIG. 1 is a block configuration diagram illustrating a power supply path-switching device 10 according to a first example embodiment.

A first example embodiment of the present invention will be described. FIG. 1 illustrates a block configuration diagram of a power supply path-switching device according to an example embodiment. Referring to FIG. 1, a power supply path-switching device 10 includes a first switching means 20, a second switching means 30, a grounding means 40, and a power consumption circuit 50.

The first switching means 20 connects a first power supply line 61, the grounding means 40, and the power consumption circuit 50 to each other based on a first control signal input from the power consumption circuit 50.

The second switching means 30 connects a second power supply line 62, the grounding means 40, and the power consumption circuit 50 to each other based on a second control signal input from the power consumption circuit 50.

The power consumption circuit 50 operates based on power supplied from the first power supply line 61 or the second power supply line 62, generates the first control signal and the second control signal according to an operating state of each of the first power supply line 61 and the second power supply line 62, and outputs the first control signal and the second control signal to the first switching means 20 and the second switching means 30, respectively.

Specifically, during a normal operation of each of the first power supply line 61 and the second power supply line 62, the power consumption circuit 50 generates a first control signal and a second control signal for connecting the first power supply line 61 and the second power supply line 62, respectively, to the power consumption circuit 50, and outputs the first control signal and the second control signal to the first switching means 20 and the second switching means 30, respectively.

On the other hand, when a failure has occurred in the first power supply line 61, the power consumption circuit 50 grounds the first power supply line 61, generates a first control signal for connecting the grounding means 40 to one end of the power consumption circuit 50, and outputs the first control signal to the first switching means 20. Further, the power consumption circuit 50 generates a second control signal for connecting the second power supply line 62 to another end of the power consumption circuit 50, and outputs the second control signal to the second switching means 30. This configuration allows the first power supply line 61 to be disconnected from the other power supply line and to be ready for repair. Further, the second power supply line 62 is connected to the grounding means 40 after passing through the power consumption circuit 50, which enables one-end power supply from the second power supply line 62 side. Accordingly, even when a failure has occurred in the first power supply line 61, supply of power to the power consumption circuit 50 or a power consumption circuit such as a repeater arranged on the second power supply line 62 can be continued as it is.

Further, when a failure has occurred in the second power supply line 62, the power consumption circuit 50 generates a first control signal for connecting the first power supply line 61 to one end of the power consumption circuit 50, and outputs the first control signal to the first switching means 20. Furthermore, the power consumption circuit 50 grounds the second power supply line 62, generates a second control signal for connecting the grounding means 40 to another end of the power consumption circuit 50, and outputs the second control signal to the second switching means 30. This configuration allows the second power supply line 62 to be disconnected from the other power supply line and to be ready for repair. Further, the first power supply line 61 is connected to the grounding means 40 after passing through the power consumption circuit 50, which enables one-end power supply from the first power supply line 61 side. Accordingly, even when a failure has occurred in the second power supply line 62, supply of power to the power consumption circuit 50 or a power consumption circuit such as a repeater arranged on the first power supply line 61 can be continued as it is.

In this case, the power consumption circuit 50 according to this example embodiment can recognize the occurrence of a failure in the first power supply line 61 and the second power supply line 62 by, for example, receiving it as failure information from a trunk station or a branch station connected to the power supply path-switching device 10.

As described above, in the power supply path-switching device 10 according to this example embodiment, the power consumption circuit 50 controls a connection between the first switching means 20, which connects the first power supply line 61, the grounding means 40, and the power consumption circuit 50 to each other, and the second switching means 30, which connects the second power supply line 62, the grounding means 40, and the power consumption circuit 50 to each other, according to an operating state of each of the first power supply line 61 and the second power supply line 62. Further, when a failure has occurred in the power supply line or the like, the power consumption circuit 50 controls the first switching means 20 and the second switching means 30 to change from the both-end power supply to the one-end power supply. Accordingly, the power consumption circuit 50 and equipment on a side in which no failure has occurred can be continuously used without providing a power supply function to the branch station side.

Modified Example of First Example Embodiment

Figure 2:
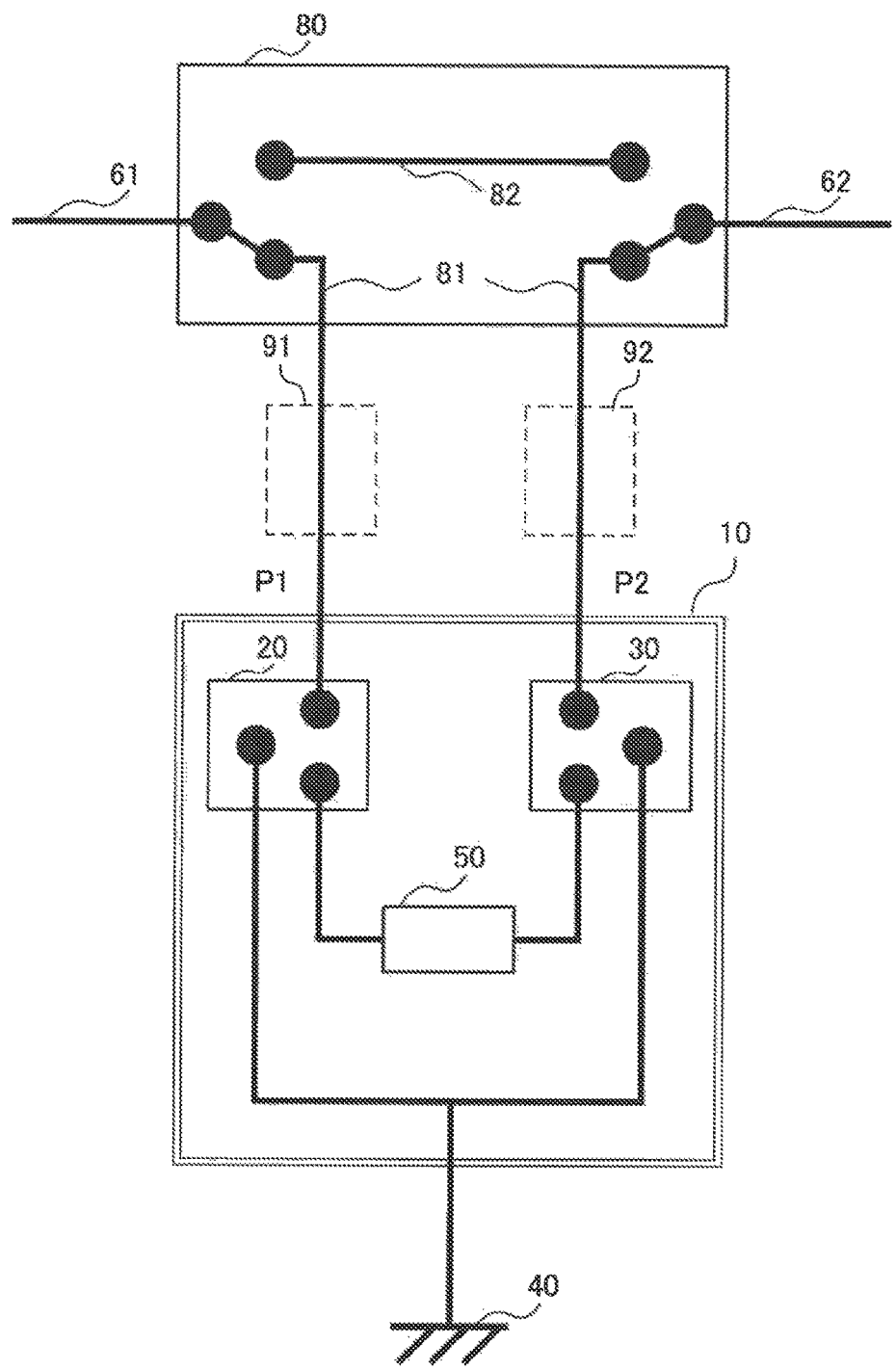
FIG. 2 is a system configuration diagram illustrating a power supply path-switching system 70 according to a modified example of the first example embodiment.

A modified example of the first example embodiment will be described. FIG. 2 illustrates a system configuration diagram of a power supply path-switching system according to this example embodiment. Referring to FIG. 2, a power supply path-switching system 70 includes the power supply path-switching device 10 and a branch device 80.

The power supply path-switching device 10 operates in the same manner as the power supply path-switching device 10 illustrated in FIG. 1 described in the first example embodiment. Specifically, during the normal operation of the first power supply line 61 and the second power supply line 62, the power supply path-switching device 10 connects each of the first power supply line 61 and the second power supply line 62 to the power consumption circuit 50. Further, when a failure has occurred in the first power supply line 61, the power supply path-switching device 10 grounds the first power supply line 61, connects the grounding means 40 to one end of the power consumption circuit 50, and connects the second power supply line 62 to another end of the power consumption circuit 50. When a failure has occurred in the second power supply line 62, the power supply path-switching device 10 connects the first power supply line 61 to one end of the power consumption circuit 50, grounds the second power supply line 62, and connects the grounding means 40 to another end of the power consumption circuit 50.

The branch device 80 includes a first power supply route 81 for causing a current supplied from the first power supply line 61 to flow to the second power supply line 62 through the power consumption circuit 50, a second power supply route 82 for causing the current supplied from the first power supply line 61 to directly flow to the second power supply line 62 without passing through the power consumption circuit 50, and a control means 83 for switching the first power supply route 81 and the second power supply route 82, which is not illustrated in FIG. 2.

When the power supply function in the power supply path-switching device 10 is normally operating, the control means 83 selects the first power supply route 81, and when the power supply function in the power supply path-switching device 10 is not normally operating, the control means 83 selects the second power supply route 82.

In the case of selecting the first power supply route 81 when the power supply function in the power supply path-switching device 10 is not normally operating, supply of power from the first power supply line 61 side to the second power supply line 62 side is interrupted. In this case, the supply of power to the repeater and the like arranged on the first power supply line 61 and the second power supply line 62 is interrupted. On the other hand, by selecting the second power supply route 82 through which the supplied current can directly flow to the second power supply line 62 from the first power supply line 61 when the power supply function in the power supply path-switching device 10 is not normally operating, the supply of power from the first power supply line 61 side to the second power supply line 62 side can be continued. Therefore, the supply of power to the repeater and the like arranged on the first power supply line 61 and the second power supply line 62 can be continued as it is.

As described above, in the power supply path-switching system 70 according to this example embodiment, when a failure has occurred in the power supply line 61 or 62, or in the power supply function of the power supply path-switching device 10, the supply of power to equipment arranged on the power supply line in which no failure has occurred can be continued by appropriately switching the switching means 20 and 30 and the power supply routes 81 and 82.

In this case, a monitoring means 91 for monitoring the presence or absence of a failure in a power supply path from the first power supply line 61 to the power consumption circuit 50, and a monitoring means 92 for monitoring the presence or absence of a failure in a power supply path from the second power supply line 62 to the power consumption circuit 50 may be further arranged. The monitoring means 91 and 92 are each indicated by a dotted line in FIG. 2. In this case, the control means 83 switches from the first power supply route 81 to the second power supply route 82 when the monitoring means 91 has detected a failure in the power supply path from the first power supply line 61 to the power consumption circuit 50, or when the monitoring means 92 has detected a failure in the power supply path from the second power supply line 62 to the power consumption circuit 50.

Second Example Embodiment

Figure 3:
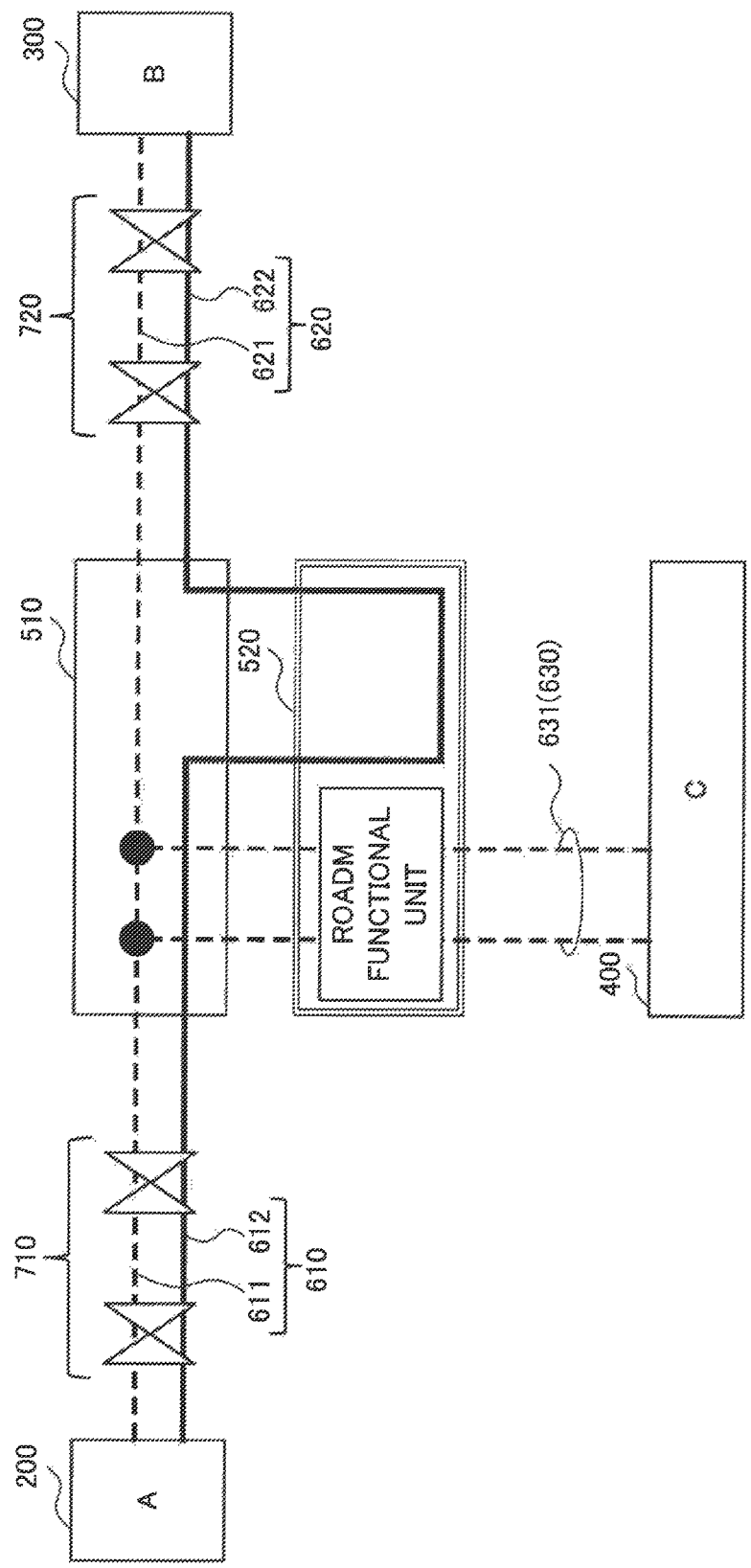
FIG. 3 is a system configuration diagram illustrating a submarine cable system 100 according to a second example embodiment.

A second example embodiment will be described. FIG. 3 illustrates a system configuration diagram of a submarine cable system according to this example embodiment. Referring to FIG. 3, in a submarine cable system 100, an A-station 200, a B-station 300, a C-station 400, a branch device 510, a ROADM (reconfigurable optical add/drop multiplexer)

device 520, submarine cables 610 to 630, and repeater groups 710 and 720 are arranged. In this example embodiment, the A-station 200, the B-station 300, and the C-station 400 are arranged on land, and the branch device 510, the ROADM device 520, and the repeater groups 710 and 720 are arranged at the bottom of sea.

The A-station 200, the B-station 300, and the C-station 400 mutually transmits and receives light signals through optical fibers 611 to 631 within the submarine cables 610 to 630, respectively. The A-station 200 and the B-station 300 supply power to the ROADM device 520, the repeater groups 710 and 720, and the like through power supply lines 612 and 622 within the submarine cables 610 and 620, respectively. In this case, the A-station 200 and the B-station 300 are trunk stations, and the C-station 400 is a branch station.

The submarine cable 610 couples the A-station 200, the branch device 510, and the ROADM device 520 to each other. The submarine cable 620 couples the B-station 300, the branch device 510, and the ROADM device 520 to each other. The submarine cable 630 couples the C-station 400 and the ROADM device 520 to each other. The submarine cables 610 to 630 include optical fibers 611 to 631, respectively, for transmitting light signals that are transmitted and received among the A-station 200, the B-station 300, and the C-station 400. Further, the submarine cables 610 and 620, respectively, include the power supply lines 612 and 622, respectively, for supplying the power, which is supplied from the A-station 200 and the B-station 300, to the ROADM device 520 and the repeater groups 710 and 720.

The repeater group 710 is arranged on the submarine cable 610, and the repeater group 720 is arranged on the submarine cable 620. The repeaters respectively constituting the repeater groups 710 and 720 are driven by the power supplied from the A-station 200 and the B-station 300 through the power supply lines 612 and 622 of the submarine cables 610 and 620, amplify intensity of light signals input from the optical fibers 611 and 621 to a desired level, and output the light signals.

Figure 4:
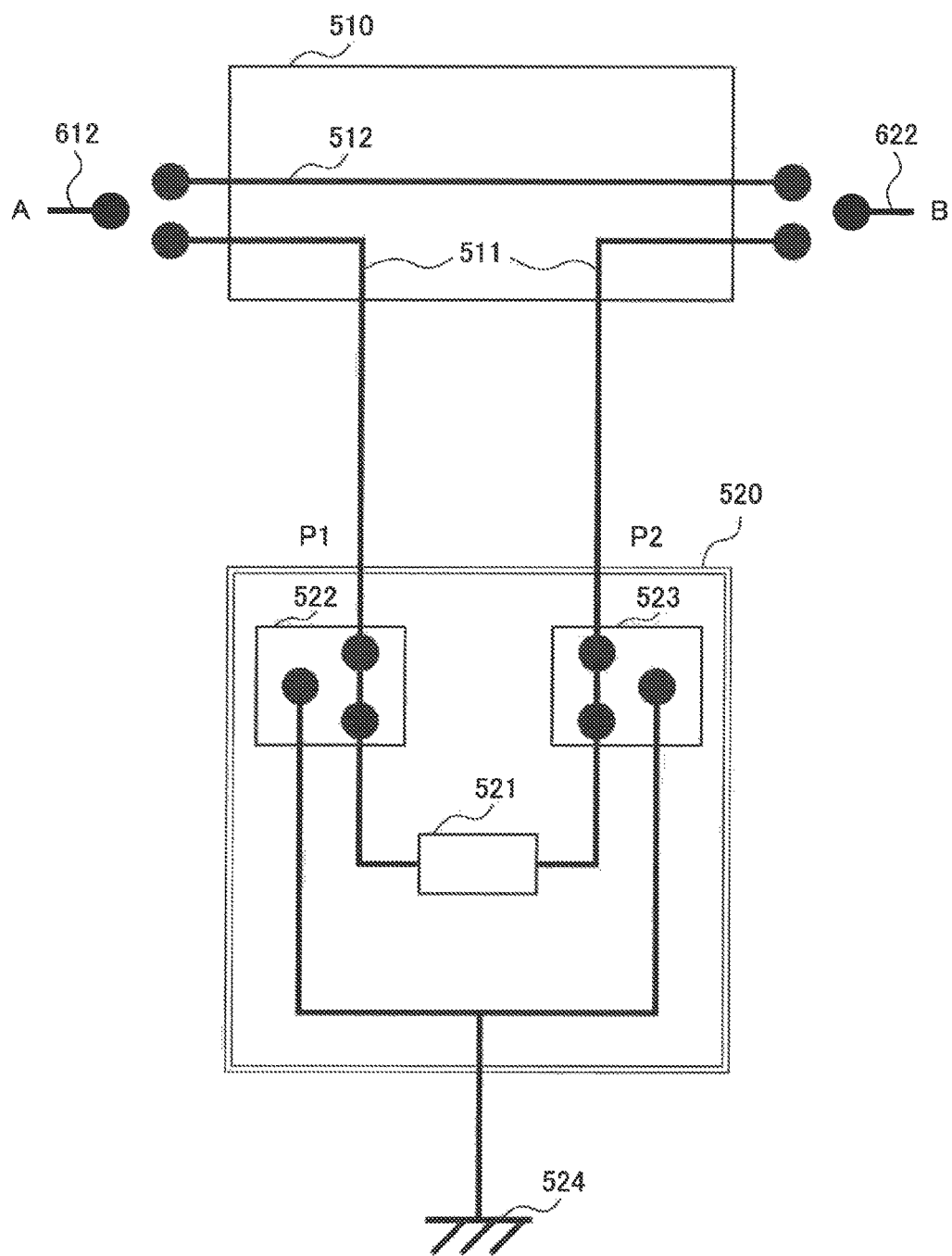
FIG. 4 is a switching control diagram of a branch device 510 and a ROADM device 520 according to the second example embodiment.

The branch device 510 is installed under water, such as at the bottom of sea, and connects the optical fibers 611, 621, and 631 to each other and also connects the power supply lines 612 and 622 to each other by a switching operation in the ROADM device 520. Further, when a failure has occurred in the power supply function in the ROADM device 520, the branch device 510 according to this example embodiment directly connects the power supply lines 612 and 622 to each other, thereby continuing the supply of power to the repeater groups 710 and 720 arranged on the submarine cables 610 and 620, respectively. FIG. 4 illustrates a switching control diagram for a function of switching the power supply path of the branch device 510.

Referring to FIG. 4, the branch device 510 includes a first power supply route 511 for causing a current supplied from the power supply line 612 on the A-station 200 side to flow to the power supply line 622 on the B-station 300 side through the ROADM device 520, and a second power supply route 512 for causing the current supplied from the power supply line 612 to directly flow to the power supply line 622 without passing through the ROADM device 520. The first power supply route 511 and the second power supply route 512 will be described later.

The ROADM device 520 is installed under water, such as at the bottom of sea, and multiplexes or branches the light signals transmitted through the optical fibers 611 to 631 within the submarine cables 610 to 630, respectively. The ROADM device 520 operates by power supplied from the A-station 200 and the B-station 300. Further, when a failure has occurred in the power supply function on the A-station 200 side or the B-station 300 side, the ROADM device 520 according to this example embodiment switches from the both-side power supply from the A-station 200 and the B-station 300 to the one-side power supply from the A-station 200 or the B-station 300, thereby continuing the supply of power to a ROADM functional unit 521, which is described below, or the repeater group on a side in which no failure has occurred. FIG. 4 also illustrates a switching control diagram for a function of switching the power supply path of the ROADM device 520.

Referring to FIG. 4, the ROADM device 520 includes the ROADM functional unit 521, switches 522 and 523, and a sea earth 524. The ROADM device 520 inserts the light signal input from the C-station 400 into the light signal input from the A-station 200 or the B-station 300 by using the ROADM functional unit 521, branches the light signal input from the A-station 200 or the B-station 300 into specific light signals, and outputs the light signals to the C-station 400. Further, the ROADM device 520 switches the switches 522 and 523 based on the operating state of the power supply function on each of the A-station 200 side and the B-station 300 side, thereby switching the both-side power supply from the A-station 200 and the B-station 300 to the one-side power supply from the A-station 200 or the B-station 300. The function of switching a power supply path in the ROADM device 520 will be described below.

Figure 5:
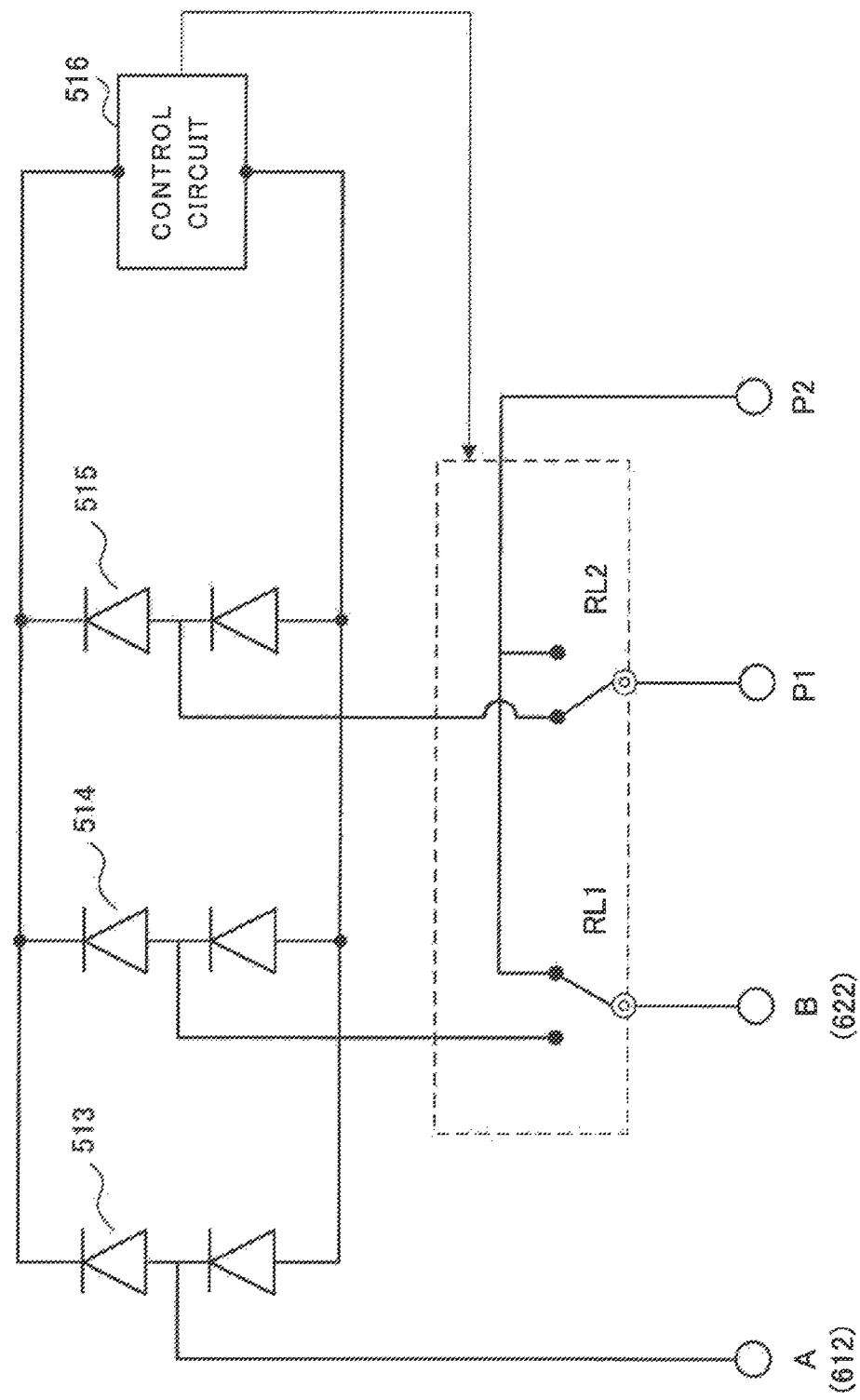
FIG. 5 is an example of a diode bridge circuit included in the branch device 510 according to the second example embodiment.

Next, a function of switching the power supply routes 511 and 512 in the branch device 510 will be described. The two power supply routes 511 and 512 illustrated in FIG. 4 can be formed of, for example, a diode bridge circuit illustrated in FIG. 5. The branch device 510 illustrated in FIG. 5 is formed of a first diode pair 513, a second diode pair 514, a third diode pair 515, a first relay RL1, a second relay RL2, and a control circuit 516. The diode pairs 513 to 515 are each formed of two diodes that are arranged in series in the same direction. In this case, the power supply line 612 on the A-station 200 side is connected to a midpoint between the two diodes of the first diode pair 513.

Figure 6:
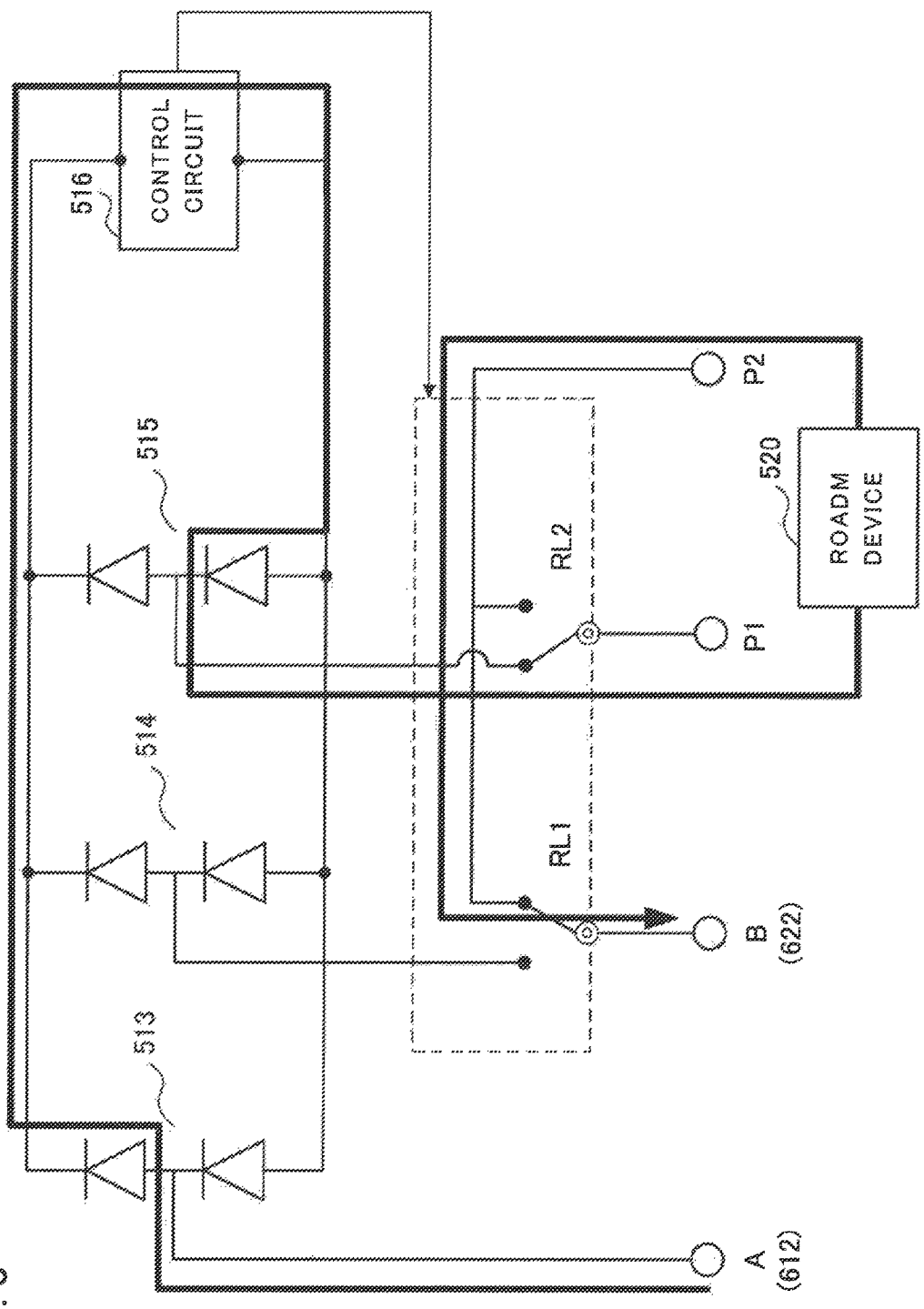
FIG. 6 is an example of the diode bridge circuit during a normal operation of the branch device 510 according to the second example embodiment.
Figure 7:
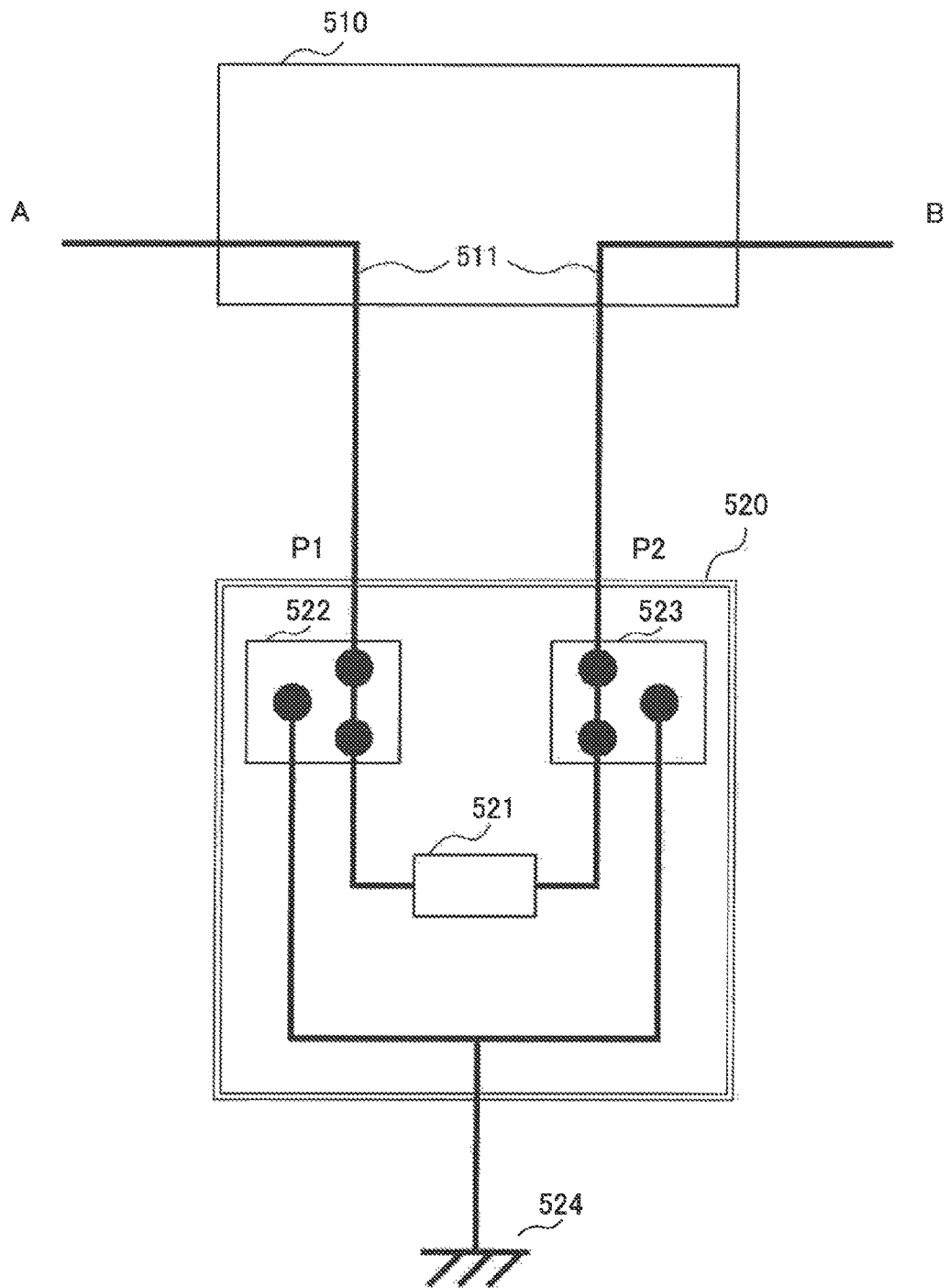
FIG. 7 is a switching control diagram during the normal operation of the branch device 510 according to the second example embodiment.

When the power supply function in the ROADM device 520 is normally operating, as illustrated in FIG. 6, the branch device 510 connects the power supply line 622 on the B-station 300 side to a port P2 of the ROADM device 520 by using the first relay RL1, and connects a midpoint between the two diodes of the third diode pair 515 to a port P1 of the ROADM device 520 by using the second relay RL2. Thus, as indicated by an arrow in FIG. 6, a DC constant current from the A-station 200(+) flows to the B-station 300(−) through the ROADM device 520. Accordingly, as illustrated in FIG. 7, the first power supply route 511 is set to supply power to the ROADM functional unit 521 of the ROADM device 520.

Figure 8:
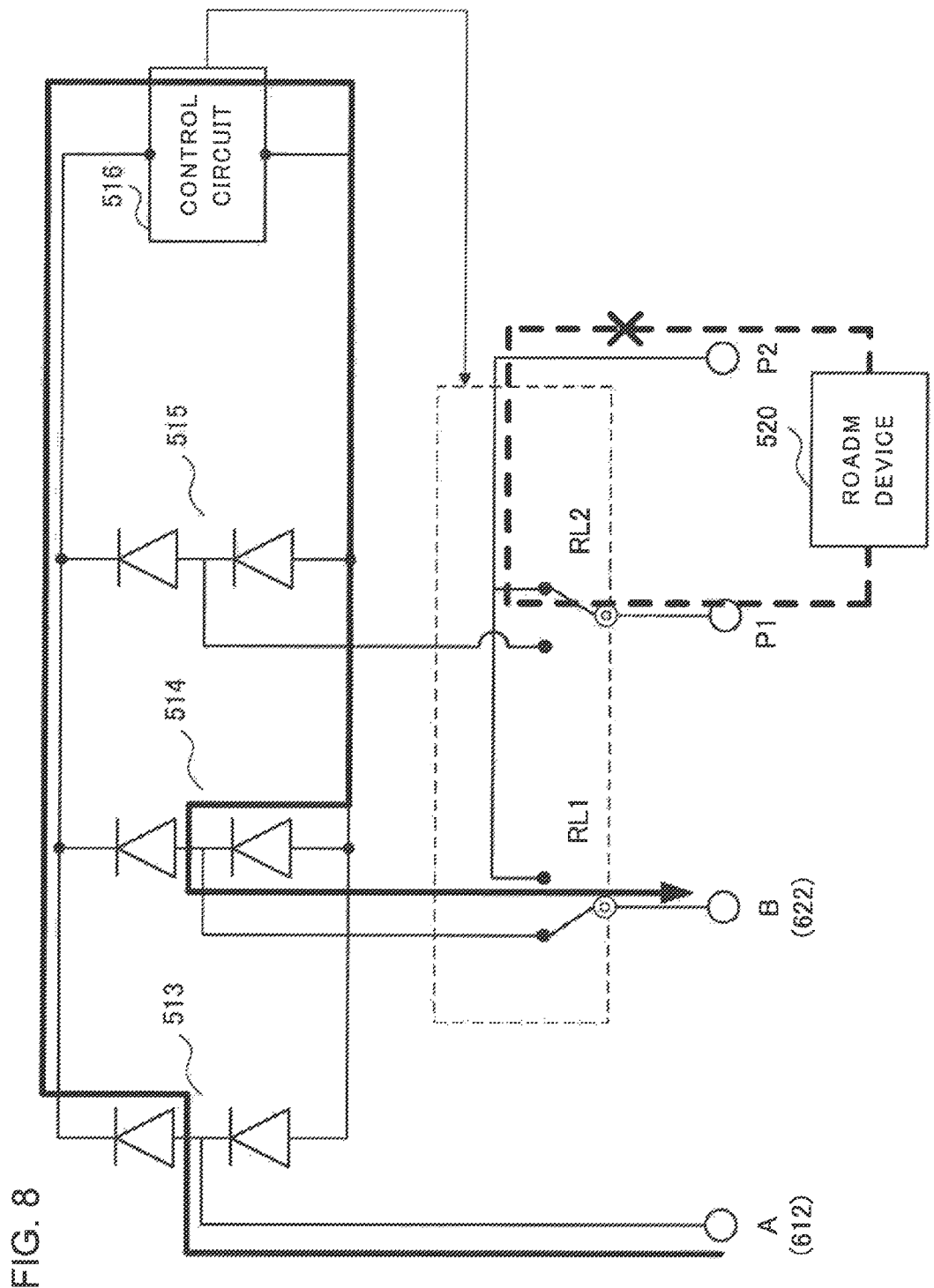
FIG. 8 is an example of the diode bridge circuit of the branch device 510 according to the second example embodiment when a failure has occurred in a power supply function in the ROADM device 520.
Figure 9:
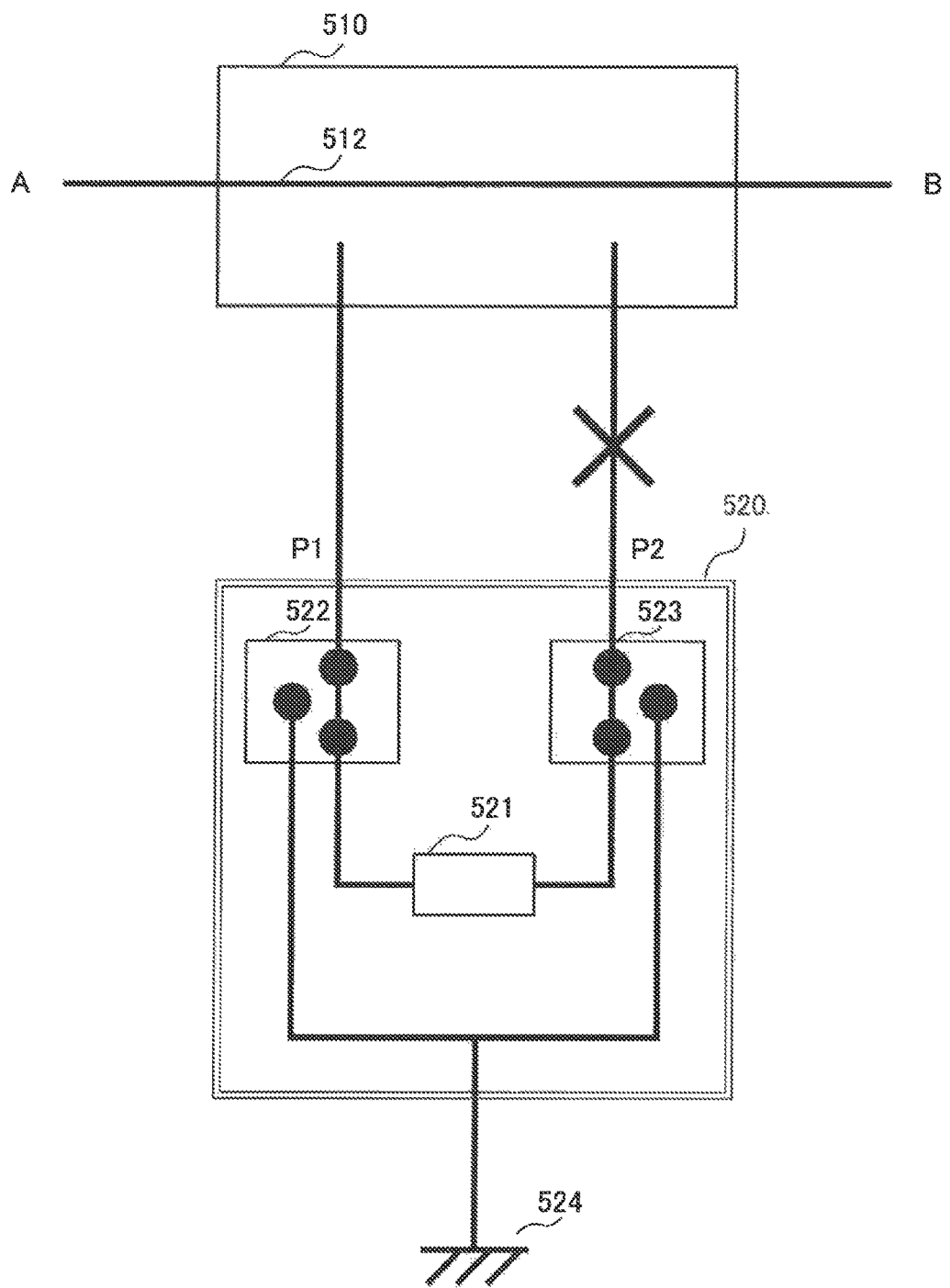
FIG. 9 is a switching control diagram of the branch device 510 according to the second example embodiment when a failure has occurred in the power supply function in the ROADM device 520.

On the other hand, when a failure (e.g., breaking of the power supply line in the vicinity of the port P2) has occurred in, for example, the power supply function in the ROADM device 520, as illustrated in FIG. 8, the branch device 510 connects the power supply line 622 on the B-station 300 side to a midpoint between the two diodes of the second diode pair 514 by using the first relay RL1, and connects the port P1 and the port P2 of the ROADM device 520 by using the second relay RL2. Thus, as indicated by an arrow in FIG. 8, a DC constant current from the A-station 200(+) directly flows to the B-station 300(−) without passing through the ROADM device 520. Accordingly, as illustrated in FIG. 9, the second power supply route 512 is set. Since power is continuously supplied to the repeater groups 710 and 720, even when a failure has occurred in the power supply function in the ROADM device 520, the transmission of light signals between the A-station 200 and the B-station 300 is continued as it is.

Note that when an optical fiber is used to connect the A-station 200 side and the B-station 300 side through the ROADM device 520 to each other, a switch for directly connecting the optical fiber between the A-station 200 side and the B-station 300 side may be further provided. Thus, when a failure has occurred in the ROADM device 520, the light signal which has passed through the ROADM device 520 can be caused to pass from the A-station 200 side to the B-station 300 side.

Next, the function of switching the power supply path in the ROADM device 520 will be described. During the normal operation, as illustrated in FIGS. 4 and 7, the ROADM device 520 connects the power supply line 612 on the A-station 200 side and the power supply line 622 on the B-station 300 side to both ends of the ROADM functional unit 521 by using the switches 522 and 523, respectively. As a result, the power from the A-station 200 flows to the B-station 300 via the repeater group 710, the ROADM device 520, and the repeater group 720, and both-end power supply from the A-station 200 and the B-station 300 is set.

Figure 10:
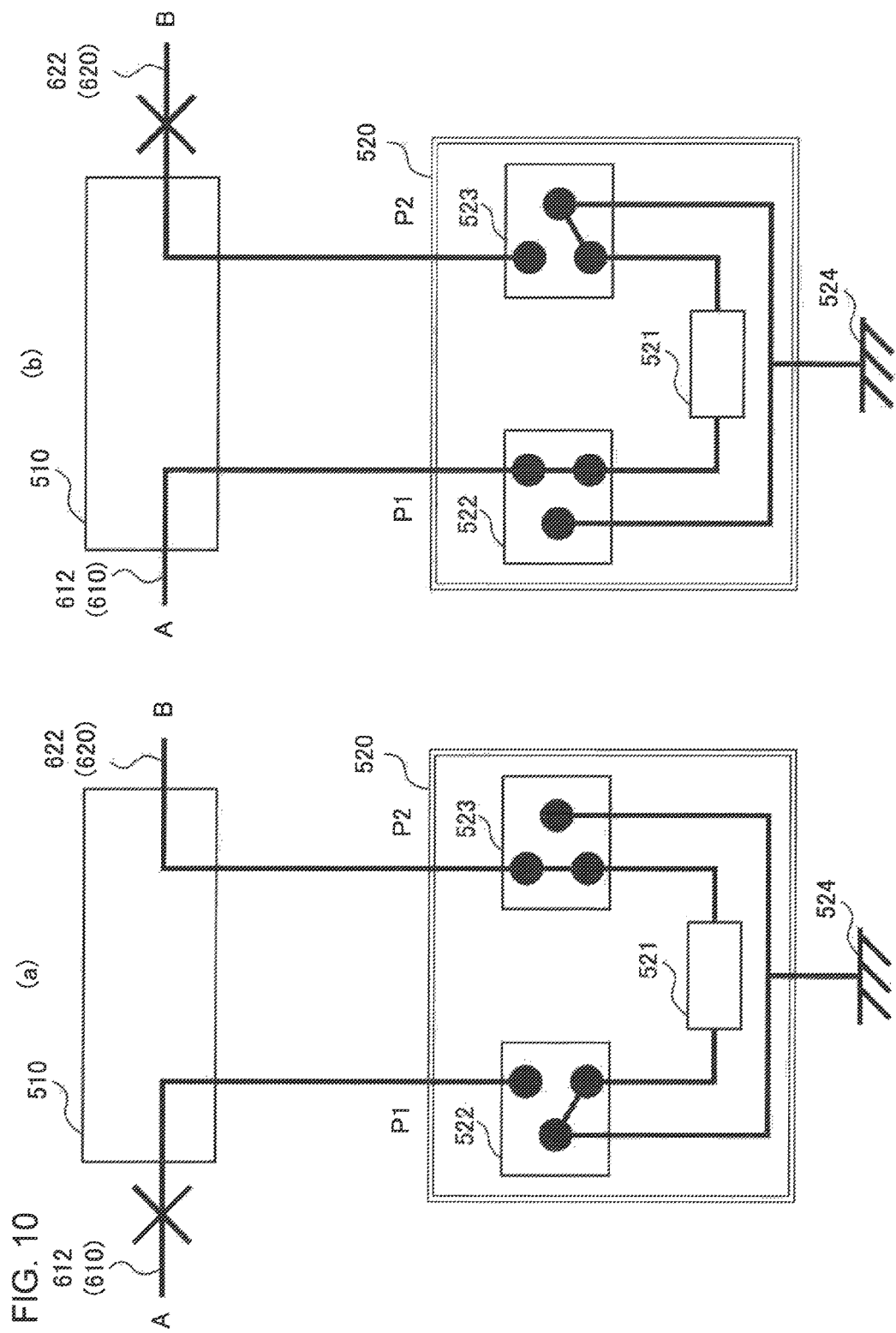
FIG. 10 (*a*) is a switching control diagram of the ROADM device 520 according to the second example embodiment when a failure has occurred in a submarine cable 610 on an A-station 200 side.

On the other hand, when a failure has occurred in the submarine cable 610 that connects the A-station 200 and the ROADM device 520, or in the submarine cable 620 that connects the B-station 300 and the ROADM device 520, the ROADM device 520 switches the both-end power supply from the A-station 200 and the B-station 300 to the one-end power supply from the A-station 200 or the B-station 300. FIG. 10(a) illustrates a switching control diagram of the ROADM device 520 when a failure has occurred in the submarine cable 610 on the A-station 200 side, and FIG. 10(b) illustrates a switching control diagram of the ROADM device 520 when a failure has occurred in the submarine cable 620 on the B-station 300 side.

When a failure has occurred in the submarine cable 610, a notice signal for notifying the failure is input to the ROADM device 520 from any one of the A-station 200, the B-station 300, and the C-station 400. When the notice signal indicating the failure in the submarine cable 610 is input, as illustrated in FIG. 10(a), the ROADM device 520 controls the switches 522 and 523 to ground the power supply line 612 of the submarine cable 610, and connects the power supply line 622 of the submarine cable 620 to the sea earth 524 after passing through the ROADM functional unit 521.

This configuration allows the submarine cable 610 to be disconnected from the other submarine cable and to be ready for repair. In addition, the power supply line 622 is connected to the sea earth 524 after passing through the ROADM functional unit 521, thereby enabling one-end power supply from the B-station 300. Accordingly, the supply of power to the repeater group 720 and the ROADM device 520 which are arranged on the B-station 300 side is continued, and light transmission between the B-station 300 and the C-station 400 is continued as it is.

On the other hand, when the notice signal indicating the failure in the submarine cable 620 is input, as illustrated in FIG. 10(b), the ROADM device 520 controls the switches 522 and 523 to ground the power supply line 622 of the submarine cable 620, and connects the power supply line 612 of the submarine cable 610 to the sea earth 524 after passing through the ROADM functional unit 521. This configuration enables the submarine cable 620 to be ready for repair, and one-end power supply from the A-station 200 enables the supply of power to the repeater group 710 and the ROADM device 520, which are arranged on the A-station 200 side, to be continued, and enables light transmission between the A-station 200 and the C-station 400 to be continued.

The submarine cable system 100 having the configuration as described above includes: the first power supply route 511 for causing the current supplied from the branch device 510 to flow to the ROADM device 520; the second power supply route 512 for causing the current supplied from the power supply line 612 to directly flow to the power supply line 622; and the switches 522 and 523 for the ROADM device 520 to switch two types of power supply routes, that is, both-end power supply and one-end power supply. Accordingly, when a failure has occurred in the power supply function in the ROADM device 520, or in the power supply lines 612 and 622, the power supply routes 511 and 512 and the switches 522 and 523 can be appropriately switched and the supply of power to the repeater group arranged on the power supply line in which no failure has occurred can be continued as it is.

Modified Example of Second Exemplary Embodiment

Figure 11:
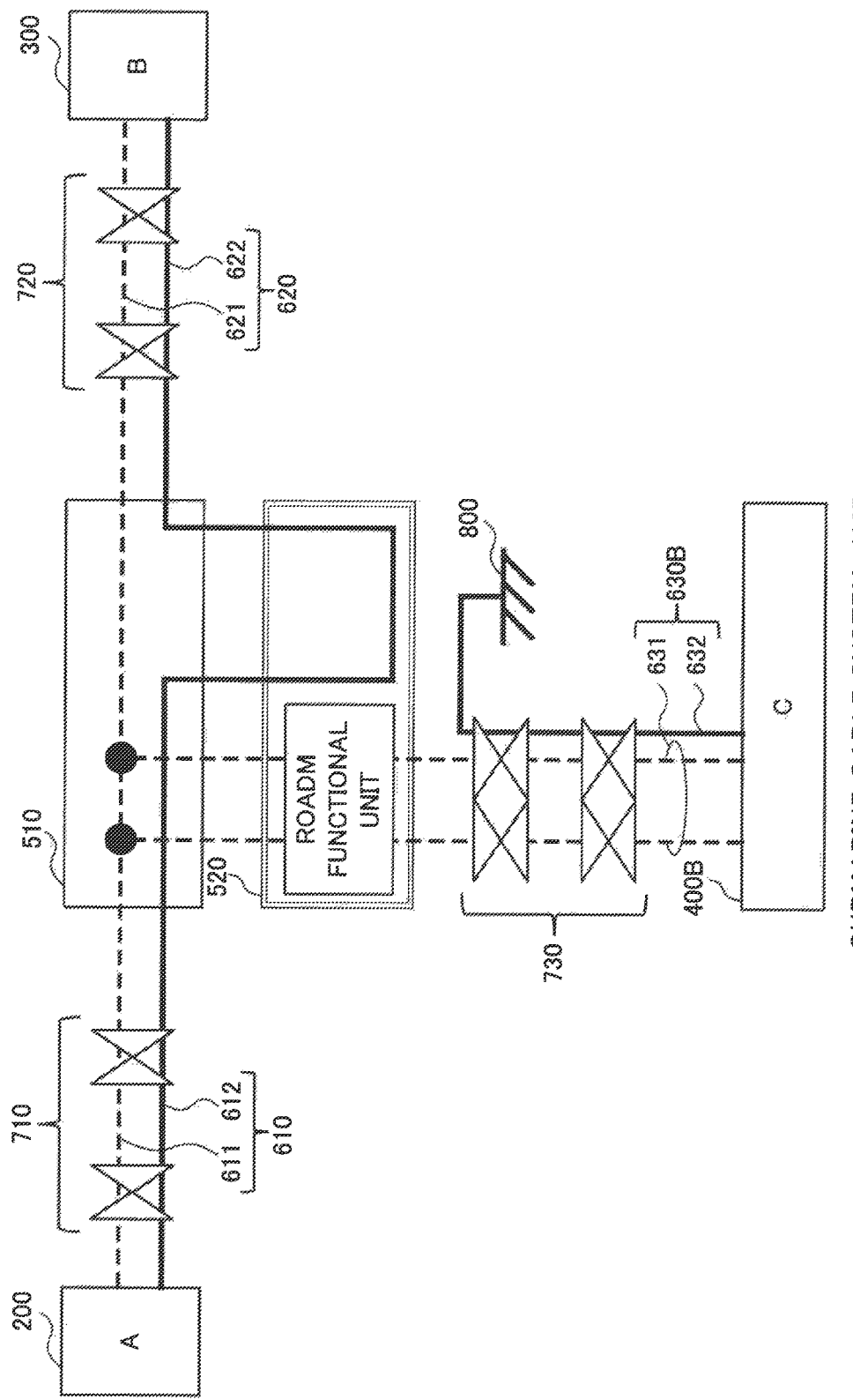
FIG. 11 is a system configuration diagram illustrating a submarine cable system 100B according to a modified example of the second example embodiment.

A modified example of the second example embodiment will be described. In the second example embodiment, no power is supplied from the C-station 400, which is a branch station. However, a repeater group 730 may be further arranged on the submarine cable 630, which connects the C-station 400 and the ROADM device 520, and the C-station 400 can supply power to the repeater group 730. FIG. 11 illustrates a system configuration diagram of a submarine cable system 100B used in this case.

In this case, the A-station 200, the B-station 300, the branch device 510, and the ROADM device 520 illustrated in FIG. 11 function in the same manner as the A-station 200, the B-station 300, the branch device 510, and the ROADM device 520, respectively, which are illustrated in FIG. 3 described in the second example embodiment. Specifically, the A-station 200 and the B-station 300 transmit and receive light signals and supply power to the repeater groups 710 and 720 and the ROADM device 520. Further, the branch device 510 includes the two power supply routes 511 and 512, which differ in whether or not to pass through the ROADM device 520, and the ROADM device 520 includes the switches 522 and 523 for switching two types of power supply routes, that is, both-end power supply and one-end power supply.

Referring to FIG. 11, a submarine cable 630B that connects a C-station 400B and the ROADM device 520 includes the optical fiber 631 for transmitting light signals between the C-station 400B and the ROADM device 520, and a power supply line 632 for supplying the power supplied from the C-station 400B to the repeater group 730. The power supply line 632 is connected to a sea earth 800 at a repeater that is closest to the ROADM device 520 in the repeater group 730. This configuration enables one-end power supply from the C-station 400B.

The repeaters constituting the repeater group 730 arranged on the submarine cable 630B are driven by the power supplied from the C-station 400B through the power supply line 632 of the submarine cable 630B, and amplify a light signal input from the optical fiber 631 to a desired level.

In the submarine cable system 100B illustrated in FIG. 11, both-end power supply from the A-station 200 and the B-station 300, or one-end power supply from the A-station 200 or the B-station 300, and one-end power supply from the C-station 400B are independently formed. Accordingly, when a failure has occurred in the power supply function in the power supply lines 612 and 622, or in the ROADM device 520, the power supply routes 511 and 512 or the switches 522 and 523 can be switched, regardless of the power supply operation in the C-station 400B. Consequently, the supply of power to the repeater group arranged on the power supply line in which no failure has occurred is continued as it is. Further, when the power supply from the A-station 200 and the B-station 300 and the power supply from the C-station 400B are independent, power supply specifications different from each other can be applied to the A-station 200 and B-station 300, and the C-station 400B, respectively.

The submarine cable system 100B according to this example embodiment is effective particularly in a case where the submarine cable system is expanded by additionally providing the ROADM device 520, the C-station 400B, the submarine cable 630B, and the repeater group 730 to the existing submarine cable system between the A-station 200 and the B-station 300 later. The submarine cable system can be expanded by additionally providing a branch station using any power supply current, regardless of whether or not a repeater group is arranged. For example, only an inexpensive main path (between the A-station 200 and the B-station 300) can be initially constructed, and a branch station and a ROADM function which have optimum specifications for the main path can be added in response to a request.

The present invention is not limited to the example embodiments described above, and modifications of the design and the like of the invention without departing from the scope of the invention are also included in the invention.

REFERENCE SIGNS LIST

10 Power supply path-switching device
20 First switching means
30 Second switching means
40 Grounding means
50 Power consumption circuit
61 First power supply line
62 Second power supply line
70 Power supply path-switching system
80 Branch device
81 First power supply route
82 Second power supply route
91, 92 Monitoring means
100 Submarine cable system
200 A-station
300 B-station
400 C-station
510 Branch device
520 ROADM device
521 ROADM functional unit
522, 523 Switch
524 Sea earth
610, 620, 630 Submarine cable
611, 621, 631 Optical fiber
612, 622 Power supply line
710, 720 Repeater group
800 Sea earth

The invention claimed is:

1. A submarine repeater comprising:
an electric circuit configured to run by both-end power supply made by a current passed between a first terminal and a second terminal via a first power supply line connected to the first terminal and a second power supply line connected to the second terminal; and
a ground circuit configured to ground a connected power supply line,
wherein the electric circuit detects a fault occurred in the first power supply line or the second power supply line, connects a non-fault power supply line without the fault to the ground circuit and runs by one-end power supply made by a current passed through the non-fault power supply line and the ground circuit.

2. The submarine repeater according to claim 1, further comprising:
a first switch configured to connect selectively the first power supply line to the ground circuit or the second power supply line; and
a second switch configured to connect selectively the second power supply line to the ground circuit or the first power supply line,
wherein the electric circuit connects the non-fault power supply line to the ground circuit, by controlling at least one of the first switch and the second switch based on the fault.

3. The submarine repeater according to claim 2, wherein the electric circuit multiplexes or branches a third light signal to or from a first light signal and a second light signal, the first light signal being transmitted to and received from the first terminal that supplies power to the first power supply line, the second light signal being transmitted to and received from the second terminal that supplies power to the second power supply line, and the third light signal being transmitted to and received from the third terminal.

4. The submarine repeater according to claim 3, wherein
the electrical circuit is a ROADM (reconfigurable optical add/drop multiplexer) circuit that controls multiplexing or branching of a light signal.

5. A submarine repeating system comprising:
the submarine repeater according to claim 4; and
a branch device configured to connect the first power supply line and the second power supply line to each other based on an operation of the submarine repeater.

6. The submarine repeating system according to claim 5, wherein
the branch device includes a first power supply route for causing current supplied from the first power supply line to flow to the second power supply line through the submarine repeater, and a second power supply route for causing current supplied from the first power supply line to flow to the second power supply line without passing through the submarine repeater, and
when power supply in the submarine repeater is normally operating, the branch device selects the first power supply route, and when power supply in the submarine repeater is not normally operating, the branch device selects the second power supply route.

7. A submarine repeating system comprising:
the submarine repeater according to claim 3; and
a branch device configured to connect the first power supply line and the second power supply line to each other based on an operation of the submarine repeater.

8. The submarine repeating system according to claim 7, wherein
the branch device includes a first power supply route for causing current supplied from the first power supply line to flow to the second power supply line through the submarine repeater, and a second power supply route for causing current supplied from the first power supply line to flow to the second power supply line without passing through the submarine repeater, and when power supply in the submarine repeater is normally operating, the branch device selects the first power supply route, and when power supply in the submarine repeater is not normally operating, the branch device selects the second power supply route.

9. The submarine repeating according to claim 8, wherein the branch device includes:
   first to third diode pairs each formed of two diodes arranged in series in a same direction, the first to third diode pairs being arranged in parallel;
   a first switching circuit configured to include one end connected to a second port of the submarine repeater, or to a midpoint between the second diode pair, and to include another end connected to the second power supply line, the second port being a node between the second power supply line and another end of the electric circuit;
   a second switching circuit configured to include one end connected to a midpoint between the third diode pair, or to the second port, and to include another end connected to a first port of the submarine repeater, the first port being a node between the first power supply line and one end of the electric circuit; and
   a controller configured to control a connection destination of each of the first switching circuit and the second switching circuit,
   wherein
   the first power supply line is connected to a midpoint between the first diode pair,
   when the first power supply route is selected, the controller connects one end of the first switching circuit to a second port of the electric circuit, and connects one end of the second switching circuit to a midpoint between the third diode pair, and
   when the second power supply route is selected, the controller connects one end of the first switching circuit to a midpoint between the second diode pair, and connects one end of the second switching circuit to the second port.

10. The submarine repeating system according to claim 9, wherein
   the branch device includes a monitor configured to monitor presence or absence of a failure in a power supply path from the first power supply line to the electric circuit, and in a power supply path from the second power supply line to the electric circuit, and when a failure is detected by the monitor, the first power supply route is switched to the second power supply route.

11. The submarine repeating system according to claim 9, further comprising:
   the first terminal configured to supply power to the first power supply line and transmits and receives the first light signal;
   the second terminal configured to supply power to the second power supply line and transmits and receives the second light signal;
   the third terminal configured to transmit and receive the third light signal;
   a first composite optical cable configured to connect the submarine repeater to the first terminal;
   a second composite optical cable configured to connect the submarine repeater to the second terminal;
   an optical cable configured to connect the submarine repeater to the third terminal;
   a first amplifier configured to be arranged on the first composite optical cable and to amplify light intensity of the first light signal; and
   a second amplifier configured to be arranged on the second composite optical cable and to amplify light intensity of the second light signal.

12. The submarine repeating system according to claim 8, wherein
   the branch device includes a monitor configured to monitor presence or absence of a failure in a power supply path from the first power supply line to the electric circuit, and in a power supply path from the second power supply line to the electric circuit, and when a failure is detected by the monitor, the first power supply route is switched to the second power supply route.

13. The submarine repeating system according to claim 8, further comprising:
   the first terminal configured to supply power to the first power supply line and transmits and receives the first light signal;
   the second terminal configured to supply power to the second power supply line and transmits and receives the second light signal;
   the third terminal configured to transmit and receive the third light signal;
   a first composite optical cable configured to connect the submarine repeater to the first terminal;
   a second composite optical cable configured to connect the submarine repeater to the second terminal;
   an optical cable configured to connect the submarine repeater to the third terminal;
   a first amplifier configured to be arranged on the first composite optical cable and to amplify light intensity of the first light signal; and
   a second amplifier configured to be arranged on the second composite optical cable and to amplify light intensity of the second light signal.

14. The submarine repeating system according to claim 7, further comprising:
   the first terminal configured to supply power to the first power supply line and transmits and receives the first light signal;
   the second terminal configured to supply power to the second power supply line and transmits and receives the second light signal;
   the third terminal configured to transmit and receive the third light signal;
   a first composite optical cable configured to connect the submarine repeater to the first terminal;
   a second composite optical cable configured to connect the submarine repeater to the second terminal;
   an optical cable configured to connect the submarine repeater to the third terminal;
   a first amplifier configured to be arranged on the first composite optical cable and to amplify light intensity of the first light signal; and
   a second amplifier configured to be arranged on the second composite optical cable and to amplify light intensity of the second light signal.

15. The submarine repeating system according to claim 14,
   wherein
   the third terminal is connected to the submarine repeater through a third composite optical cable including the optical cable and a third power supply line, supplies power to the third power supply line, and further includes a third amplifier that is arranged on the third composite optical cable and amplifies light intensity of the third light signal.

16. A submarine repeating method comprising:

running an electric circuit by both-end power supply made by a current passed between a first terminal and a second terminal via a first power supply line connected to the first terminal and a second power supply line connected to the second terminal;

detecting a fault occurred in the first power supply line or the second power supply line, by the electric circuit;

connecting a non-fault power supply line without the fault to a ground circuit; and running by one-end power supply made by a current passed through the non-fault power supply line and the ground circuit configured to ground a connected power supply line.

* * * * *

UNITED STATES PATENT AND TRADEMARK OFFICE
CERTIFICATE OF CORRECTION

PATENT NO. : 10,348,440 B2
APPLICATION NO. : 15/570462
DATED : July 9, 2019
INVENTOR(S) : Ryuji Aida It is certified that error appears in the above-identified patent and that said Letters Patent is hereby corrected as shown below:

In the Claims

Column 13, Line 9; In Claim 9, after "repeating", insert --system--

Signed and Sealed this
Fifth Day of November, 2019

Andrei Iancu
*Director of the United States Patent and Trademark Office*